Patented Jan. 17, 1933

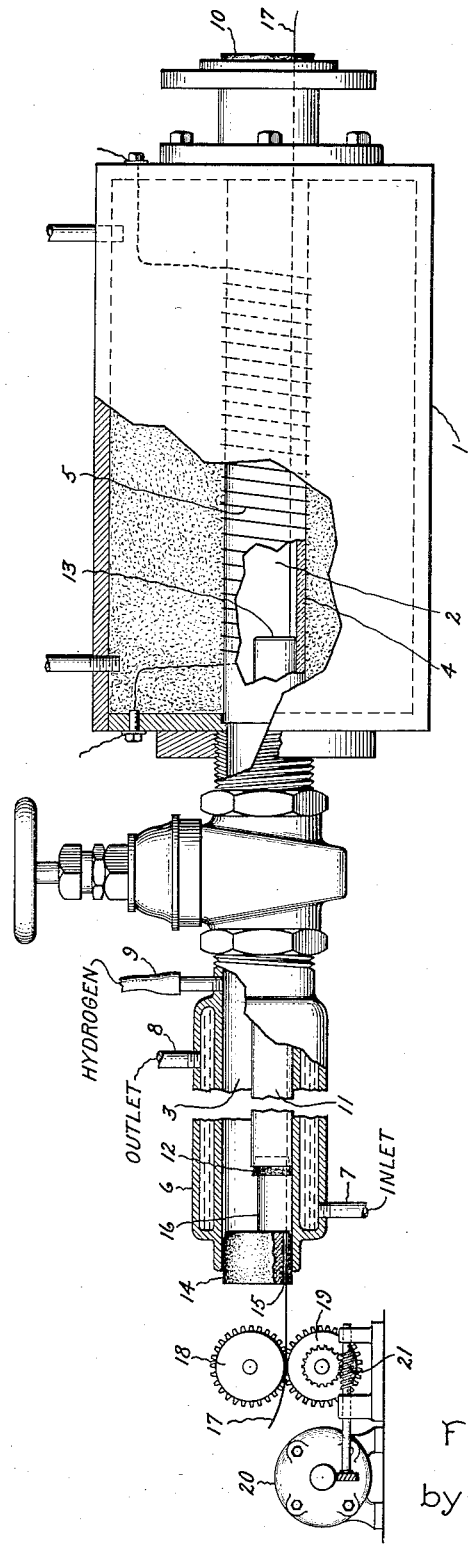

1,894,825

UNITED STATES PATENT OFFICE

FLOYD C. KELLEY, OF SCHENECTADY, NEW YORK, ASSIGNOR TO GENERAL ELECTRIC COMPANY, A CORPORATION OF NEW YORK

ANNEALING PROCESS

Application filed May 1, 1930. Serial No. 449,021.

The present invention relates to an annealing process and more particularly to a process and apparatus by which a bright finish may be produced on a metal during the annealing process.

Ordinarily, in annealing metals in a hydrogen furnace, for example cold rolled steel, the surface of the steel becomes oxidized. This is due to the fact that it is practically impossible to eliminate oxygen and water vapor in a hydrogen furnace since there is usually some diffusion of air back into the furnace against the pressure of hydrogen gas and there is probably a quantity of condensed moisture held either in the furnace insulation or in the cooling chamber of the furnace. The oxygen from these sources is usually present in sufficient amount to provide an oxidized coating on the annealed metal.

Hydrogen furnaces ordinarily comprise a heating chamber and a cooling chamber. Hydrogen at elevated temperatures is able to reduce the oxide on steel but at certain lower temperatures such as occur in the cooling chamber of the furnace, the activity of steel for oxygen is greater than the activity of hydrogen for oxygen. In cooling down through this critical temperature range the steel becomes covered with an oxide film.

It is an object of the present invention to provide a simple and efficient process for preventing the oxidation of metal in an annealing process. Other objects will appear hereinafter.

The novel features which are characteristic of the invention are set forth with particularity in the appended claims. The invention itself however will best be understood from reference to the following specification when considered in connection with the accompanying drawing in which the single figure is a view partly in elevation and partly in section of an apparatus whereby my invention may be carried into effect.

Referring more particularly to the drawing, I have indicated at 1 a relatively small hydrogen furnace comprising a heating chamber 2, and a cooling chamber 3. The heating chamber comprises an electrical insulating tube 4 made of alundum or other suitable material surrounded by a heating coil 5 which may be supplied with electric current from a source, not shown. The cooling chamber 3 is surrounded by a water jacket 6 through which a cooling fluid may be circulated by means of an inlet pipe 7 and an outlet pipe 8. Hydrogen gas is supplied to the furnace through an inlet pipe 9. The gas fills the cooling and heating chambers of the furnace and is burned as it emerges through an opening in the closure member 10 at the outer end of the heating chamber 2. The particular hydrogen furnace illustrated on the drawing is old, well known and constitutes no part of the present invention.

Ordinarily, in annealing a metal strip, the latter is drawn first through the heating chamber 2 and then through the cooling chamber 3 of the furnace. Under such conditions, the annealed strip has an oxide coating thereon. To prevent oxidation of the annealed strip, I place an iron tube 11 within the hydrogen furnace so that it is disposed substantially entirely within the cooling chamber 3 but extends an appreciable distance into the heating chamber 2 as indicated on the drawing. The cold end of the tube 11 is closed with a graphite plug 12 and the hot end with a metal plate 13. The plug 12 and plate 13 are each provided with an opening which is substantially equal in area to the cross section of the metal strip to be annealed. The cooling chamber 3 is provided at its outer end with a graphite plug 14 which also has an opening 15 therein substantially equal in area to the cross section of the metal strip to be annealed. In order to prevent binding of the metal strip as it is drawn through the furnace and tube 11, the outer end of tube 11 is spaced several inches from plug 14 and held in that position by a spacing member 16 inserted between plugs 12 and 14.

In operation, the strip 17 to be annealed is fed from a reel, not shown, through the plug 10. It is then drawn through the heating chamber 2 of the furnace, through the closed iron tube 11 and plug 14 and between a pair of rubber covered geared rolls 18 and 19 driven at a desired rate of speed from an electric motor 20 which is connected to the rolls 18 and 19 by a worm and wheel reduction gearing 21. Enough tension is maintained on the strip to keep it spaced from the bottom of the furnace and the bottom of tube 11.

In annealing steel, for example a cold rolled strip or ribbon, the strip is drawn slowly through the furnace and between rolls 18 and 19 by means of the motor 20 and the reduction gearing 21. It is essential that the strip be drawn through the tube 11 at such a rate that substantially no oxidation of the strip can take place either within the tube 11 or within the furnace at the point where the strip emerges from tube 11.

The importance of controlling the rate of movement of the strip through the furnace will be clear from the following explanation. The iron tube 11 contains a dead atmosphere, i. e., there is no circulation of hydrogen in the tube except that which is provided by diffusion of hydrogen from the furnace chamber through the slots in the plug 12 and plate 13 in the ends of the tube. Whatever oxygen may be inside of tube 11 at the start of the annealing operation, is quickly removed therefrom because of contact of the oxygen with that portion of the iron tube near the hot end thereof. That latter portion of the tube is at a temperature which is low enough to permit the iron to retain the oxygen in the presence of hydrogen. In the furnace illustrated on the drawing, the uniform hot zone therein may be considered to be about 8" long. If the strip to be annealed is heated in this zone for about 10 minutes and 8" of the strip pulled through tube 11 every 10 minutes, it will be found that the strip or ribbon contains a series of oxide sections spaced about 8" apart. This oxidation is probably due to the fact that a small amount of oxygen enters tube 11 from the heating chamber 2. If the strip remains stationary for an appreciable length of time enough oxygen enters tube 11 to form an appreciable oxide coating on the strip a short distance from the plate 13. At that point in the tube the temperature of the furnace is not high enough to prevent oxidation of the strip if the latter is maintained stationary for a period of time such as 8 minutes. If, on the other hand, the strip is moved through the tube 11 at a relatively slow rate, for example about one foot per minute, no appreciable oxidation of the strip takes place within the tube. Moreover when the strip emerges from the plug 16 it has a temperature so low that no oxidation can take place at that point.

With a small hydrogen furnace such as illustrated on the drawing, the movement of the strip through the furnace should be very slow and preferably continuous in order to prevent oxidation either within the tube 11 or at the point where the strip emerges from the tube. This may be accomplished with a speed of about one foot per minute. Obviously, the strip could be moved through the hydrogen furnace at practically any rate of speed desired. At higher speeds however, it would be necessary to have a relatively long heating zone in order to remove any oxide coating on the strip and a relatively long tube 11 so that the temperature of the strip as it emerges from tube 11 would be so low that oxidation of the strip could not take place.

What I claim as new and desire to secure by Letters Patent of the United States, is:

1. In combination, an annealing furnace comprising a heating chamber and a cooling chamber, a closed receptacle mounted in said cooling chamber and spaced from the outer end thereof, said receptacle extending a relatively short distance into the heating chamber, said receptacle having closure members provided with openings through which a metal strip may be drawn, and means whereby a reducing gas may be supplied to said furnace.

2. In combination, an annealing furnace comprising a cooling chamber provided with a water cooled jacket and a heating chamber, an elongated ferrous metal container mounted in said cooling chamber and extending a relatively short distance into said heating chamber, said receptacle being provided with closure members having slots therein through which a metal strip may be drawn, means for spacing said container from the outer end of the cooling chamber and means whereby a hydrogen gas may be supplied to said furnace.

3. The method of continuously annealing a metal strip which comprises heating the metal strip to annealing temperature in a reducing atmosphere, passing the strip while at annealing temperature into a cooling dead atmosphere of reducing gas and moving the strip through said dead atmosphere at a rate to permit reduction of the temperature of the strip to a point at which oxidation of the strip can not take place as the strip emerges from said dead atmosphere.

In witness whereof, I have hereunto set my hand this 30th day of April, 1930.

FLOYD C. KELLEY.